United States Patent
Tan et al.

(10) Patent No.: US 10,479,694 B2
(45) Date of Patent: Nov. 19, 2019

(54) PROCESS OF CLEAN PRODUCTION OF ELECTRONIC GRADE HIGH-PURITY COPPER OXIDE

(71) Applicants: Guangdong Guanghua Sci-Tech Co., Ltd., Shantou (CN); Guangdong Toneset Science & Technology Co., Ltd., Guangzhou (CN)

(72) Inventors: Ze Tan, Shantou (CN); Siping Huang, Shantou (CN); Yilang Zhou, Shantou (CN); Wei He, Shantou (CN); Chong Wang, Shantou (CN); Haiyan Lu, Shantou (CN)

(*) Notice: Subject to any disclaimer, the term of this patent is extended or adjusted under 35 U.S.C. 154(b) by 178 days.

(21) Appl. No.: 15/871,147

(22) Filed: Jan. 15, 2018

(65) Prior Publication Data

US 2018/0179077 A1  Jun. 28, 2018

Related U.S. Application Data

(63) Continuation of application No. PCT/CN2017/084622, filed on May 17, 2017.

(30) Foreign Application Priority Data

Dec. 23, 2016  (CN) .......................... 2016 1 1205790

(51) Int. Cl.
  *C01G 3/02*  (2006.01)
  *B01D 21/26*  (2006.01)
(52) U.S. Cl.
  CPC .............. *C01G 3/02* (2013.01); *B01D 21/262* (2013.01); *C01P 2006/80* (2013.01)
(58) Field of Classification Search
  CPC ........... C01C 1/185; C01C 1/242; C01G 3/02; B01D 21/26; B01D 21/262
  See application file for complete search history.

(56) References Cited

FOREIGN PATENT DOCUMENTS

| CN | 101327945 A | 12/2008 |
|---|---|---|
| CN | 102602977 A | 7/2012 |
| CN | 102730742 A | 10/2012 |
| CN | 103011250 A | 4/2013 |
| CN | 103011251 A | 4/2013 |
| CN | 103101957 A | 5/2013 |
| CN | 103101958 A | 5/2013 |
| CN | 103991894 A | 8/2014 |
| CN | 104326503 A | 2/2015 |
| CN | 104891551 A | 9/2015 |

OTHER PUBLICATIONS

CN104891551, Mingchuan et al, Sep. 2015, machine translation (Year: 2015).*
CN First Office Action dated Sep. 29, 2017 in the corresponding CN application(application No. 201611205790.2).
CN 2nd Office Action dated Apr. 25, 2018 in the corresponding CN application (application No. 201611205790.2).
International Search Report dated Sep. 22, 2017 in the corresponding application (application No. PCT/CN2017/084622).

* cited by examiner

*Primary Examiner* — Melvin C. Mayes
*Assistant Examiner* — Smita S Patel
(74) *Attorney, Agent, or Firm* — Kilpatrick Townsend & Stockton, LLP

(57) ABSTRACT

The present disclosure provides a process of clean production of electronic grade high-purity copper oxide. The process includes (1) preparing a carbon-ammonia system solution with a certain ratio of $CO_2$, $NH_3$ and $H_2O$; (2) dissolving copper under a slightly negative pressure and at a system temperature less than or equal to 60° C.; the reaction ends until the concentration of copper in the carbon-ammonia system solution reaches 80 to 140 g/L; (3) adding sodium polyacrylate; the reaction solution is heated to 60-80° C. under a reduced pressure for deamination; (4) disposing basic copper carbonate to separate the solid from the liquid by a centrifuge to give an filter cake and copper-containing clear solution; (5) calcining the filter cake at 250-600° C. for 1-5 hours to give an electronic grade high purity copper oxide; ammonia collected in step (3), the copper-containing clear solution collected in step (4), and carbon dioxide and water vapor collected in step (5) are transferred to the solution-preparing device of step (1) and directly used as raw materials for preparing carbonate-ammonia system solution, wherein the copper-containing clear solution is used as water. The process of production of the disclosure has a shortened processing line and a low energy consumption; it is not only cost saving but also can achieve goals of energy saving, reduced emission and environment pollution.

6 Claims, No Drawings

PROCESS OF CLEAN PRODUCTION OF ELECTRONIC GRADE HIGH-PURITY COPPER OXIDE

TECHNICAL FIELD

The present disclosure relates to a process for preparing copper oxide, particularly to a process for preparing electronic grade high-purity copper oxide, and more specifically to a process of clean production of electronic grade high-purity copper oxide for the circulation and utilization of ammonia, carbon dioxide and copper-containing clear solution produced during a reaction.

BACKGROUND TECHNOLOGY

Flexible printed circuit (FPC) is a printed circuit made of polyimide or polyester film as a substrate and having a high reliability and excellent flexibility. With the rapid development of microelectronic technology, the printed circuit board has been developed fast in the direction of multi-layer, lamination, functionalization and integration, which causes a large-scale adoption of micro-hole, narrow pitch and fine wire in the design of the printed circuit for the conception and design of circuit diagram. FPC will be increasingly widely used due to having a special function and will become a trend in the printed circuit board in the future. It is technically great difficult to manufacture the flexible printed circuit board, the conventional vertically electroplating process can no longer meet the technical requirements for high quality and reliability of interconnected holes, and therefore horizontally electroplating has been developed. At present, the supplement of copper ions to an acid-copper system in the horizontally electroplating in FPC industry mainly depends on copper oxide powder. However, the copper oxide powder required in this process must have a high activity and can be rapidly dissolved in the electroplating solution system.

Many scientific and technical literatures and patents involve methods for preparing copper oxide. The conventional method for preparing copper oxide may include: reacting a soluble copper salt, such as copper sulfate, copper nitrate and the like, with a precipitant, such as sodium carbonate, sodium bicarbonate and the like under a temperature, converting the soluble copper salt into solid basic copper carbonate, which is washed, calcined and decomposed into copper oxide. The conventional method of preparation, due to high content of impurities in copper source, is not adaptable to the requirements of current advanced FPC electroplating.

Chinese invention patent application No. 201410550840.5 discloses a method for preparing activated copper oxide powder comprising using a copper plate as a raw material, preparing a copper-ammonia complex solution through ammonia leaching process, followed by a fine filtration and evaporation under slightly negative pressure to give basic copper carbonate, which then was calcined at a low temperature to give activated copper oxide powder product. The copper oxide prepared by the method has characteristics of high activity and high purity of the product. However, the method, making no comprehensive circulation and utilization of introduced agents, has a high production cost and lacks competitiveness on the market.

Chinese invention patent application No. 201210068019.0 discloses a method for preparing copper oxide by dissolving copper, including: adding copper, ammonia water, and powdery ammonium bicarbonate or ammonium carbonate or a mixture of ammonium bicarbonate and ammonium carbonate into a reaction vessel, stirring continuously while introducing air or oxygen to conduct the reaction, and at the same time, disposing a circulating device to retransfer ammonia gas and carbon dioxide volatilized from the reaction vessel into the reaction vessel after recycling so as to get into the reaction; the reaction ended when the pressure of the system no longer changes as the temperature of the system increases, the undissolved copper in the reaction system was removed, the reaction solution was filtered, and the filter cake was retained, washed and calcined at a temperature of 500° C.-700° C. to give copper oxide. In the method, ammonia gas and carbon dioxide produced during the decomposition of ammonium bicarbonate when copper is dissolved in ammonia bicarbonate are recycled and utilized, but the method for recycling the same utilizes the absorbent to absorb a volatile gas and then the absorbent is heated so that the volatile gas escapes. Such a circulation and utilization process requires reheating and energy consumption, and does not meet the requirement for environment protection. In addition, the copper-ammonia complex solution formed after dissolving copper further contains lots of ammonia and carbon dioxide, which are not recycled and utilized in the method, and the filtrate containing copper ions and a small amount of ammonia is directly drained off as waste water. This is wasteful and applies great pressure on the environment protection.

SUMMARY OF THE DISCLOSURE

In order to solve the above problems, an objective of the present disclosure is to provide a process of clean production of electronic grade high-purity copper oxide, in which the added chemicals and water may be circulated and utilized.

In order to achieve the above objective, the process of clean production of the electronic grade high-purity copper oxide of the present disclosure includes the following steps in sequence:

(1) continuously preparing a carbon-ammonia system solution through a solution-preparing device, wherein the molar ratio of $CO_2:NH_3:H_2O$ is 1:1.3-2: 17-20;

(2) adding the carbon-ammonia system solution into a reaction vessel preloaded with metallic copper, and constantly inhaling air, oxygen or ozone under a slightly negative pressure to keep the temperature of the reaction system equal to or less than 60° C.; the negative pressure is closed when the concentration of copper in the carbon-ammonia system reaches 80-140 g/L;

(3) filtering the copper-ammonia solution to a reaction kettle for deamination, adding sodium polyacrylate; the reaction solution is heated to a temperature of 60-80° C. under a reduced pressure for deamination after stirring evenly; when the deamination ends, sodium polyacrylate is added in an amount of 0.2-0.6 g/L based on a volume of the copper-ammonia filtrate and ammonia water is collected during deamination;

(4) disposing basic copper carbonate resulted in step (3) to separate the solid from the liquid by a centrifuge and to give a filter cake and a copper-containing clear solution; collecting the copper-containing clear solution;

(5) calcining the filter cake at a temperature of 250-600° C. for 1-5 hours to give an electronic grade high-purity copper oxide, and collecting carbon dioxide and water vapor produced during the calcination;

the ammonia water collected in the above step (3), the copper-containing clear solution collected in the step (4) and carbon dioxide and water vapor collected in the step (5) are transferred into the solution-preparing device in the step (1) and directly used as raw materials to prepare the carbonate-ammonia system solution, wherein the copper-containing clear solution is used as water.

The carbonate-ammonia system solution of the above step (1) is prepared by firstly injecting the ammonia water into the solution-preparing device and then introducing carbon dioxide, which is followed by spraying with water. Moreover, the procedure is a continuous closed-loop operation. The water vapor collected in the above step (5), after dust removing, is transferred into the solution-preparing device along with carbon dioxide by a fan.

In order to make better use of the introduced chemical agent, ammonia gas volatilized during dissolving copper in the above step (2) is transferred into the solution-preparing device by the fan to form a part of the closed-loop operation for recycling.

The slightly negative pressure in the above step (2) is between −0.01 to −0.02 Mpa of the atmospheric pressure.

The reduced pressure in the above step (3) is between −0.03 to −0.08 Mpa of the atmospheric pressure.

In order to further reduce the environmental pollution, micro-amount ammonia gas generated in the above steps due to the problem of airtightness is uniformly recycled by a gas-collecting hood, and then absorbed by circulating spray of a dilute acid spraying solution to give analytically pure ammonium salt.

The above dilute acid spraying solution is preferably sulfuric acid, nitric acid or acetic acid, and more preferably dilute sulfuric acid.

The process of clean production of the electronic grade high-purity copper oxide of the present disclosure, with metal copper as raw material, uses an ammonia leaching process to prepare copper-ammonia complex solution, followed by deamination and filtration to give basic copper carbonate, which is then calcined to give electronic grade high-purity copper oxide; the carbon-ammonia system solution is formulated with ammonia water, carbon dioxide and water in a certain ratio, so that ammonia, carbon dioxide and the copper-containing clear solution collected in each step during the whole process can be directly circulated and utilized without treatment. This is not only cost saving, but also achieves goals of energy saving, reduced emission and environment pollution. The process of production of the disclosure has a shortened processing line, a low energy consumption, and a friendly production environment, and the resulted product has a high purity, a high activity and a controllable particle size, and it is particularly adaptive to the quality requirements for the copper ions in a horizontally electroplating acid-copper system in the FPC industry.

DETAILED DESCRIPTION

The technical solutions of the present disclosure are further described below with reference to the specific examples. However, these examples are not intended to limit the scope of the present disclosure and changes, for example, of the steps or technical parameters for preparing a copper-ammonia complex solution, shall fall within the scope of the present disclosure without departing from the concept of the present disclosure.

Example 1

(1) Preparation of carbon-ammonia system solution: firstly, 2520 g of 25% ammonia water was injected into a solution-preparing device, 1100 g of carbon dioxide was slowly introduced and the reaction solution was sprayed and prepared with pure water; 6125 g of pure water was consumed. The molar ratio of the three materials was kept in a range of 1:1.3-2: 17-20 during the whole preparation.

(2) 10 kg of metallic copper (excess) was added into a stainless steel reaction kettle, 20 L of the prepared carbon-ammonia system solution was added into the reaction kettle, then the negative pressure circulating pump was turned on to inhale air at −0.01 to −0.02 Mpa, and turned off after 3-4 hours (the duration is not a constant value and depends on the flow of inhaled air), and the reaction of dissolving copper ended. 9.2 kg of metal copper was retained, 0.8 kg of copper was dissolved out, and the concentration of the copper solution was 100 g/L. Ammonia gas volatilized during the dissolving was transferred to the solution-preparing device by a fan for recycling.

(3) The copper solution was filtered into a reaction kettle for deamination and stirred rapidly, and 6 g of sodium polyacrylate was added. After stirring evenly, the reaction solution was heated for deamination under a condition of −0.03 to −0.08 Mpa, and the ammonia water collected was transferred to the solution-preparing device.

(4) The solid was separated from the liquid. The copper-containing clear solution was collected, and 1.6 kg of basic copper carbonate, including about 50% of copper, was obtained. The copper-containing clear solution was transferred to the solution-preparing device.

(5) Basic copper carbonate was calcined at 450° C. for 4 hours to give 0.99 kg of copper oxide as a finished product. The water vapor produced during the calcination was transferred to the solution-preparing device along with carbon dioxide by the fan after dust removing.

Example 2

(1) Preparation of carbon-ammonia system solution: (continuous preparation) 6250 g of recycled ammonia water was injected at a flow into the solution-preparing device and supplemented with 1070 g of 25% ammonia water while slowly introducing 655 g of carbon dioxide, and the reaction solution was sprayed and prepared with the recycled copper-containing clear solution and pure water; 2480 g of the copper-containing clear solution and 100 g of pure water was consumed. By flow control, the molar ratio of the three materials was kept in a range of 1:1.3-2:17-20 during the whole preparation.

(2) 9.2 kg of remaining metallic copper (excess) in the example 1 was added, 20 L of the prepared carbon-ammonia system solution was added into the reaction kettle, then the negative pressure circulating pump was turned on to inhale oxygen at −0.01 to −0.02 Mpa, and turned off after 2-4 hours (the duration is not a constant value and depends on the flow of inhaled oxygen), and the reaction of dissolving copper ended. 8.36 kg of electrolytic copper was retained, 0.84 kg of copper was dissolved out, and the concentration of the copper solution was 100 g/L. Ammonia gas volatilized during the dissolving was transferred to the solution-preparing device by a fan for recycling.

(3) The copper solution was filtered into a reaction kettle for deamination and stirred rapidly, and 10 g of sodium polyacrylate was added. After stirring evenly, the reaction solution was heated for deamination under a condition of −0.03 to −0.08 Mpa, and the ammonia water collected was transferred to the solution-preparing device.

(4) The solid was separated from the liquid. The copper-containing clear solution was collected, and 1.68 kg of basic copper carbonate, including about 49% of copper, was obtained. The copper-containing clear solution was transferred to the solution-preparing device.

(5) Basic copper carbonate was calcined at 400° C. for 4 hours to give 1.05 kg of copper oxide as a finished product. The water vapor produced during the calcination was transferred to the solution-preparing device along with carbon dioxide by the fan after dust removing.

Example 3

(1) Preparation of carbon-ammonia system solution: (continuous preparation) 8580 g of recycled ammonia water was injected at a flow into the solution-preparing device and supplemented with 170 g of 25% ammonia water while introducing 435 g of carbon dioxide at a flow, and the reaction solution was sprayed and prepared with recycled copper-containing clear solution and pure water; 994 g of the copper-containing clear solution and 100 g of pure water was consumed. By flow control, the molar ratio of the three materials was kept in a range of 1:1.3-2:17-20 during the whole preparation.

(2) 8.36 kg of remaining metallic copper (excess) in the example 2 was added, 20 L of the prepared carbon-ammonia system solution was added into the reaction kettle, then the negative pressure circulating pump was turned on to inhale air at −0.01 to −0.02 Mpa, and turned off after 3-4 hours (the duration is not a constant value and depends on the flow of inhaled air), and the reaction of dissolving copper ended. 7.54 kg of electrolytic copper was retained, 0.82 kg of copper was dissolved out, and the concentration of the copper solution was 100 g/L. Ammonia gas volatilized during the dissolving was transferred to the solution-preparing device by a fan for recycling.

(3) The copper solution was filtered into a reaction kettle for deamination and stirred rapidly, and 10 g of sodium polyacrylate was added. After stirring evenly, the reaction solution was heated for deamination under a condition of −0.03 to −0.08 Mpa, and the ammonia water collected was transferred to the solution-preparing device.

(4) The solid was separated from the liquid. The copper-containing clear solution was collected, and 1.67 kg of basic copper carbonate, including about 49% of copper, was obtained. The copper-containing clear solution was transferred to the solution-preparing device.

(5) Basic copper carbonate was calcined at 500° C. for 3 hours to give 1.02 kg of copper oxide as a finished product. The water vapor produced during the calcination was transferred to the solution-preparing device along with carbon dioxide by the fan after dust removing.

Example 4

(1) Preparation of carbon-ammonia system solution: (continuous preparation) 7994 g of recycled ammonia water was injected at a flow into the solution-preparing device and supplemented with 160 g of 25% ammonia water while introducing 405 g of carbon dioxide at a flow, and the reaction solution was sprayed and prepared with recycled copper-containing clear solution and pure water; 920 g of the copper-containing clear solution and 100 g of pure water was consumed. By flow control, the molar ratio of the three materials was kept in a range of 1:1.3-2:17-20 during the whole preparation.

(2) 7.54 kg of remaining metallic copper in the example 3 was added, 20 L of the prepared carbon-ammonia system solution was added into the reaction kettle, then the negative pressure circulating pump was turned on to inhale ozone, and turned off after 1-3 hours (the duration is not a constant value and depends on the flow of inhaled ozone), and the reaction of dissolving copper ended. 6.78 kg of electrolytic copper was retained, 0.76 kg of copper was dissolved out, and the concentration of the copper solution was 100 g/L. Ammonia gas volatilized during the dissolving was transferred to the solution-preparing device by a fan for recycling.

(3) The copper solution was filtered into a reaction kettle for deamination and stirred rapidly, and 8 g of sodium polyacrylate was added. After stirring evenly, the reaction solution was heated for deamination under a condition of −0.03 to −0.08 Mpa, and the ammonia water collected was transferred to the solution-preparing device.

(4) The solid was separated from the liquid. The copper-containing clear solution was collected, and 1.52 kg of basic copper carbonate, including about 50% of copper, was obtained. The copper-containing clear solution was transferred to the solution-preparing device.

(5) Basic copper carbonate was calcined at 550° C. for 5 hours to give 0.95 kg of copper oxide as a finished product. The water vapor produced during the calcination was transferred to the solution-preparing device along with carbon dioxide by the fan after dust removing.

Micro-amount ammonia gas generated in the above steps due to the problem of airtightness was uniformly recycled by a gas-collecting hood, and then the micro-amount ammonia gas was absorbed circulating spray of sulfuric acid, nitric acid or acetic acid to give analytically pure ammonium salt.

The content and purity of the copper oxide products resulted in the above Examples 1-4 were measured. Its content (based on copper oxide) was greater than or equal to 99.5%, and the content of impurity elements are as follows: Ca≤5 ppm, Zn≤5 ppm, Ni≤5 ppm, Fe≤5 ppm, Mg≤5 ppm, Pb≤5 ppm, Mn≤2 ppm, which meets the quality requirements for copper ions in the horizontally electroplating acid-copper system in the FPC industry.

The statistics of material consumptions are as follows (kg/kg copper oxide)

|  | Example 1 | Example 2 | Example 3 | Example 4 |
| --- | --- | --- | --- | --- |
| Pure Water | 6.19 | 0.1 | 0.1 | 0.11 |
| Ammonia | 2.55 | 1.02 | 0.17 | 0.17 |
| Carbon Dioxide | 1.11 | 0.62 | 0.43 | 0.43 |

It can be seen from the above table that the statistics of material consumptions is relatively high when initially introducing. However, with the closed-loop recycling and utilization of subsequent by-products, the material consumption tends to constant, which is not only a reduced emission, but also is a great cost saving.

The invention claimed is:
1. A process of clean production of an electronic grade high-purity copper oxide, comprising the following steps in sequence:
(1) continuously preparing a carbon-ammonia system solution, wherein the molar ratio of $CO_2:NH_3:H_2O$ is 1:1.3-2:17-20;
(2) adding the carbon-ammonia system solution into a reaction vessel preloaded with metallic copper, and constantly inputting air, oxygen or ozone under a negative pressure of between −0.01 and −0.02 Mpa to keep the temperature of the reaction system equal to or less than 60° C.; the negative pressure is closed when the concentration of copper in the carbon-ammonia system solution reaches 80-140 g/L;

(3) filtering the copper, carbon-ammonia system solution to a reaction kettle for deamination, adding sodium polyacrylate to obtain a reaction solution after stirring evenly; the reaction solution is heated to a temperature of 60-80° C. under a pressure of between −0.03 and −0.08 MPa for deamination and ammonia water is collected during deamination, wherein the sodium polyacrylate is added in an amount of 0.2-0.6 g/L based on a volume of the copper, carbon-ammonia system solution filtrate;

(4) separating solid from liquid by a centrifuge obtaining a copper carbonate including copper and collecting a copper-containing clear solution;

(5) calcining the copper carbonate at a temperature of 250-600° C. for 1-5 hours to give an electronic grade high-purity copper oxide, and carbon dioxide and water vapor are produced during the calcination; the ammonia water collected in the above step (3), the copper-containing clear solution collected in the step (4) and carbon dioxide and water vapor collected in the step (5) are directly used as raw materials to prepare the carbon-ammonia system solution, wherein the copper-containing clear solution is used as water.

2. The process of clean production of the electronic grade high-purity copper oxide according to the claim 1, wherein the carbon-ammonia system solution of the above step (1) is prepared by firstly adding the ammonia water and then introducing carbon dioxide, which is followed by spraying with the copper-containing clear solution and/or pure water, and the procedure is a continuous closed-loop operation.

3. The process of clean production of the electronic grade high-purity copper oxide according to the claim 1, wherein the water vapor collected in the above step (5), after dust removing, is added along with carbon dioxide by a fan.

4. The process of clean production of the electronic grade high-purity copper oxide according to the claim 3, wherein ammonia gas volatilized during dissolving copper in the above step (2) is added by the fan to form a part of the closed-loop operation for recycling.

5. The process of clean production of the electronic grade high-purity copper oxide according to the claim 4, wherein micro-amount ammonia gas generated in the above steps due to the problem of airtightness is uniformly recycled by a gas-collecting hood, and then absorbed by circulating spray of a dilute acid spraying solution to give analytically pure ammonium salt.

6. The process of clean production of the electronic grade high-purity copper oxide according to the claim 5, wherein the dilute acid spraying solution is sulfuric acid, nitric acid or acetic acid.

* * * * *